(12) United States Patent
Brotzmann

(10) Patent No.: US 10,151,007 B2
(45) Date of Patent: Dec. 11, 2018

(54) METHOD AND DEVICE FOR SUPPLYING ENERGY INTO A SCRAP METAL PILE IN AN ELECTRIC ARC FURNACE

(71) Applicant: PRIMETALS TECHNOLOGIES AUSTRIA GMBH, Linz (AT)

(72) Inventor: Karl Brotzmann, Amberg (DE)

(73) Assignee: PRIMETALS TECHNOLOGIES AUSTRIA GMBH (AT)

(*) Notice: Subject to any disclaimer, the term of this patent is extended or adjusted under 35 U.S.C. 154(b) by 665 days.

(21) Appl. No.: 14/437,903

(22) PCT Filed: Oct. 24, 2013

(86) PCT No.: PCT/EP2013/072268
§ 371 (c)(1),
(2) Date: Apr. 23, 2015

(87) PCT Pub. No.: WO2014/064193
PCT Pub. Date: May 1, 2014

(65) Prior Publication Data
US 2015/0267271 A1  Sep. 24, 2015

(30) Foreign Application Priority Data

Oct. 24, 2012 (DE) .................. 10 2012 020 788

(51) Int. Cl.
| | | |
|---|---|---|
| H05B 11/00 | (2006.01) | |
| F27D 13/00 | (2006.01) | |
| C21C 5/56 | (2006.01) | |
| C21C 5/52 | (2006.01) | |
| F27B 3/08 | (2006.01) | |
| F27B 3/20 | (2006.01) | |
| F27B 3/22 | (2006.01) | |

(52) U.S. Cl.
CPC ............ *C21C 5/565* (2013.01); *C21C 5/5217* (2013.01); *F27B 3/08* (2013.01); *F27B 3/085* (2013.01);
(Continued)

(58) Field of Classification Search
CPC .... C21C 5/28; C21C 5/32; C21C 5/35; C21C 5/52; C21C 5/54; C21C 5/305;
(Continued)

(56) References Cited

U.S. PATENT DOCUMENTS 4,827,486 A * 5/1989 Brotzmann ........... C21C 5/5217
373/2
5,286,277 A * 2/1994 Aizatulov ................ C21C 5/35
75/523

(Continued)

FOREIGN PATENT DOCUMENTS

| CN | 1088620 A | 6/1994 |
|---|---|---|
| CN | 1187856 A | 7/1998 |

(Continued)

OTHER PUBLICATIONS

Chinese Office Action, dated Apr. 18, 2016, issued in corresponding Chinese Patent Application No. 201380055916.0. English translation. Total 12 pages.

(Continued)

*Primary Examiner* — Hung D Nguyen
(74) *Attorney, Agent, or Firm* — Ostrolenk Faber LLP

(57) ABSTRACT

A method for supplying energy to a scrap metal pile (9) in an electric arc furnace (2). Energy is supplied by jets of hot gas in a first phase. Energy is supplied by electric arcs in a second phase after the first phase is completed. Hot gas is supplied via at least six jets. A device (1) for the method has an electric arc furnace (2), one or more blowing devices (6a, 6b, 6c), supply jets of reactant hot air into the chamber (7) of the electric arc furnace (8). The devices have a total of at least six nozzles (10a, 10b, 10c, 10d, 10e, 10f) with nozzle openings. Fuel conducting devices (8) supply fuel to the jets of reactant hot air.

21 Claims, 2 Drawing Sheets

(52) U.S. Cl.
CPC .............. *F27B 3/205* (2013.01); *F27B 3/225* (2013.01); *F27D 13/002* (2013.01); *Y02P 10/216* (2015.11)

(58) Field of Classification Search
CPC ....... C21C 5/462; C21C 5/466; C21C 5/4606; C21C 5/4633; C21C 5/527; C21C 5/562; C21C 5/565; C21C 5/567; C21C 5/5217; C21C 5/5229; C21C 5/5252; F27B 3/045; F27B 3/065; F27B 3/08; F27B 3/085; F27B 3/18; F27B 3/183; F27B 3/186; F27B 3/22; F27B 3/24; F27B 3/28; F27B 3/205; F27B 3/225; F27D 13/002
USPC .......... 373/2, 60, 61, 63, 73, 80, 85; 266/44, 266/47, 144, 156, 160, 177, 212, 217, 266/225, 240, 265; 75/10.41, 10.42, 12, 75/52, 59, 60, 401, 501, 503, 508, 523, 75/528, 529, 530, 540, 543, 545, 623, 75/705

See application file for complete search history.

(56) References Cited

U.S. PATENT DOCUMENTS

| | | | |
|---|---|---|---|
| 5,851,263 A * | 12/1998 | Bernet | C21C 5/5217 373/73 |
| 6,030,431 A | 2/2000 | Deloche | 75/414 |
| 8,557,018 B2 | 10/2013 | Brotzmann | 75/401 |
| 2008/0041189 A1 * | 2/2008 | Brotzmann | C21C 5/562 75/401 |

FOREIGN PATENT DOCUMENTS

| | | |
|---|---|---|
| CN | 1611613 A | 5/2005 |
| CN | 1774516 A | 5/2006 |
| DE | 195 21 518 | 8/1996 |
| DE | 102 19 488 A1 | 11/2003 |
| DE | 103 17 195 A1 | 11/2004 |
| EP | 0 257 450 A2 | 3/1988 |
| GB | 2082624 A | 3/1982 |
| JP | H 08-157929 | 6/1996 |
| WO | WO 96/41896 A1 | 12/1996 |
| WO | WO 2004/092422 A2 | 10/2004 |

OTHER PUBLICATIONS

International Search Report dated Jan. 28, 2014 issued in corresponding International patent application No. PCT/EP2013/072268.
Written Opinion dated Jan. 28, 2014 issued in corresponding International patent application No. PCT/EP2013/072268.
International Preliminary Report on Patentability dated Feb. 16, 2015 issued in corresponding International patent application No. PCT/EP2013/072268.

* cited by examiner

METHOD AND DEVICE FOR SUPPLYING ENERGY INTO A SCRAP METAL PILE IN AN ELECTRIC ARC FURNACE

CROSS-REFERENCE TO RELATED APPLICATIONS

The present application is a 35 U.S.C. §§ 371 national phase conversion of PCT/EP2013/072268, filed Oct. 24, 2013, which claims priority of German Patent Application No. 10 2012 020 788.3, filed Oct. 24, 2012, the contents of which are incorporated by reference herein. The PCT International Application was published in the German language.

FIELD OF TECHNOLOGY

The invention relates to a method for supplying energy into a scrap metal pile in an electric arc furnace

TECHNICAL BACKGROUND

Prior Art

Methods are known, in which energy is supplied into a scrap metal pile in an electric arc furnace by means of the electric arc and also by jets of hot gas.

German patent DE19521518 describes a method for introducing fossil energy into a scrap metal pile. At the same time as the supply of energy is by means of electric arcs and by jets of gases containing hot oxygen, channels are melted in a scrap metal pile and the further supply of fossil energy then ensues through the channels.

German patent DE10317195A1 shows a number of jets blowing hot gas onto the scrap metal pile, while energy is supplied by means of electric arcs.

However, there may occur interferences unwanted, significant overheating of the upper furnace chamber, in the area between the cover wall of the electric arc furnace and the surface of the scrap metal pile facing the cover wall. This area of an electric arc furnace is designed to withstand temperatures of up to approximately 1700° C. without damage. However, at overheating to higher temperatures, temperature-related damage may occur.

SUMMARY OF THE INVENTION

Technical Object

It is the object of the present invention to provide a method and a device for, in addition to supplying energy to the electric arc furnace, also supplying energy into a scrap metal pile in an electric arc furnace so that the risk of overheating and thus the associated damage to the upper furnace chamber is reduced.

Technical Solution

This object is achieved by a method for supplying energy into a scrap metal pile in an electric arc furnace, wherein
in a first phase, energy is supplied using jets of hot gas, and after conclusion of the first phase
in a second phase, discontinuing the jets of hot gas and then energy is supplied using electric arcs.

The hot gas is supplied by a plurality comprised of at least six for example. Each of the six supply jets conveys at most one sixth, for example, of the overall quantity of hot gas supplied.

The temperature of the hot gas at the time of first contact with the scrap metal pile is above 1500° C. It is particularly preferred for the hot gas to have a temperature of above 2000° C. The temperature may be up to 3000° C., or even above. The hotter is the hot gas, the better is the transmission of energy from the hot gas to the scrap metal pile.

The hot gas is generally produced as follows:

Air is brought to a temperature of approximately 1000 to 1300° C. by a heating apparatus and the air is pressurized, for instance to 1 atm, in order to enable blowing air out of a gas jet through a nozzle. The air is preferably also enriched with oxygen, up to approximately 35% oxygen content. This air may be enriched with oxygen. This air is subsequently referred to with the term reactant hot air.

The reactant hot air is blown as a gas jet out through a nozzle into the interior of the electric arc furnace. After the air exits the nozzle, fuel is supplied to the gas jet, the fuel being for instance carbon dust, oil or gas, such as for instance natural gas. Gas is a preferable fuel since it can be easily managed and is siphoned particularly well into the gas jet from the reactant hot air. Natural gas is particularly preferred because it is easily available and because temperatures of up to 3000° C. can be easily reached by burning natural gas. The fuel reacts exothermically with oxygen in the gas jet of the reactant hot air, producing a jet of hot gas.

This jet of hot gas contacts the scrap metal pile, infiltrates the scrap metal pile by melting a channel and in this way outputs its energy onto the scrap. In this way, energy is supplied to the scrap metal pile by the jet of hot gas.

Advantageous Effects of the Invention

Jets of hot gas behave differently in a scrap metal pile, depending on how the void volume is distributed over the scrap metal pile. The void volume, which is located between the bulky scrap present in the scrap metal pile and small pieces of scrap, is distributed as a function of the local distribution of these differently sized scrap pieces. A scrap metal pile, which is melted in an electric arc furnace, initially has a volume of up to 90% of void volume and 10% scrap, wherein the void volume is essentially formed by small pieces of scrap. If jets of hot gas are blown into a scrap metal pile, they preferably flow out of the channels melted by the jets through areas which have a large void volume and heat up these areas particularly intensively. When energy is supplied using jets of hot gas, the effects of an uneven distribution of the void volume is greater, and this greater energy supply is concentrated locally on few jets of hot gas.

The inventive method surprisingly has significant advantages when fossil energy is supplied by hot gas and electrical energy is supplied when melting scrap in an electric arc furnace.

In accordance with the invention and compared with conventional methods, a scrap metal pile has a reduced risk of overheating of the upper furnace chamber to temperatures above 1700° C., and therefore can be heated in an operationally reliable manner using hot gas.

This is achieved because energy is supplied by means of hot gas, without at the same time electrical energy being supplied by means of electric arcs. Furthermore, the energy quantity introduced by an individual jet of hot gas is limited, by the energy introduced by hot gas being divided into at least six, quantitative, and thus also limited jets, in view of the energy quantity transported thereby in each instance. The individual jets can be aligned such that they are not able to cross one another in the scrap metal pile. Otherwise, the energy quantity would once again be concentrated more than desired in accordance with the invention.

On account of these measures, hot gas passes through larger areas of the scrap metal pile compared with the prior art. This prevents small pieces in the scrap metal pile from only being rapidly heated locally and partially melted. This would have caused the scrap metal pile to have been particularly quickly compacted as a result of softening in these locally rapidly heated areas. The jets of hot gas, and further hot gases produced when the scrap metal pile is heated, can if necessary no longer flow through the scrap metal pile, because the flow resistance there has become too large. This also prevents part of the jets of hot gas, and the further hot gases produced when the scrap metal part is heated, from flowing back through the channels melted by the jets of hot gas, for instance at speeds of 700 to 900 m/s, and/or prevents blown jets of hot gas from being taken in again.

The invention avoids problems that occur in conventional methods of increasing the flow resistance in the scrap metal pile and back-flows into the channels in the upper furnace chamber melted by the jets of hot gas. This prevents the upper furnace chamber from being overheated and as a result damaged.

According to one embodiment, approx. 40 to 60% of the energy supplied to the scrap metal pile is supplied by means of hot gas, and approximately 60 to 40% by means of electric arcs.

The jets of hot gas develop due to the reaction of fuel with jets of reactant hot air. The reactant hot air is supplied by means of one or a number of blowing apparatus. Upon their exit from this blowing apparatus, the distance between the jets of reactant hot air advantageously amounts to at least double their diameter at the exit. This means that the jets of hot gas produced from the jets of reactant hot air no longer join to form one jet before they come into contact with the scrap metal pile, and also do not join within the scrap metal pile.

According to a further preferred embodiment, the distance between the jets of hot gas in the scrap metal pile amounts to at least five times the diameter of the jets of reactant hot air upon exiting the blowing apparatus. This means that several jets of hot gas do not join in the scrap metal pile to form one jet.

In conventional electric arc furnaces, the scrap metal pile is melted locally in the operating area of electric arc at the start of the effect of the electric arc. An effect on areas of the scrap metal pile, which are further distanced from the electric arc and are not located in its operating area, is only available to a limited degree. This applies in particular to so-called "cold spots", in other words the areas on the furnace wall, in which, in accordance with the prior art, additional energy is if necessary introduced by means of so-called "oxy-fuel burners". The degree of efficiency of these burners is however limited. They can only be operated for short periods of time because they quickly form a flue above the burner, through which the combustion gases leave the scrap in a hot state. Furthermore, the scrap is heavily oxidized by this burner.

According to one embodiment of the inventive method, at least one jet of hot gas, and preferably several jets of hot gas, is aligned toward zones of the scrap metal pile outside of the operating area of the electric arc. The alignment of some jets of hot gas to such zones is particularly advantageous here, if, as a result, the afore-cited burners for heating "cold spots" are replaced. A large area of the scrap there is advantageously captured by the jets of hot gas. A burner of this type can be omitted entirely. It is advantageous for the heating of these areas if the corresponding jets of hot gas each convey a maximum of a twelfth, for example, of the overall quantity of hot gas supplied. The maximum energy supplied by these jets per time unit is thus reduced again by half. The aim of this measure is that these areas are as far as possible only effectively pre-heated and are only melted minimally, and the risk of damage to the electric arc furnace in these areas is reduced by the energy supplied by means of the jet of hot gas.

The inventive combination of the supply of fossil energy by way of hot gas in a first phase and of electrical energy by way of electric arcs in a second phase, when melting scrap in an electric arc furnace, provides operationally reliable energy through jets of hot gas into the scrap metal pile and also advantageously alters the conditions for the subsequent introduction of electrical energy by the arcs.

According to the present invention, the jets of hot gas cause preheating in particular of the small-sized elements of the scrap in the overall scrap metal pile. The scrap metal pile thus rapidly compacts, from for instance a first scrap basket, due to a softening and on the one hand results in favourable conditions for charging a subsequent scrap basket in the electric arc furnace prior to activation of the electric arc. On the other hand, the inventive heating of an if necessary charged scrap basket by means of jets of hot air also produces favourable conditions for the subsequent use of arcs. Mainly during the initial phase of the melting process by means of electric arcs, brief interruptions in the electric arc when melting scrap, which are referred to as "flickers" are known to cause problematic reactions to the electric network. However, it has been seen that the inventive measures significantly reduce these "flickers", leading to huge advantages for the supply of electrical energy.

A further subject matter of the present application is an apparatus for implementing the inventive method.

Such an apparatus includes an electric arc furnace with a base, side walls and a cover wall. It also includes one or a plurality of blowing apparatus for supplying jets of reactant hot air into the interior of the electric arc and fuel supply devices, which supply devices are suited to supplying fuel to the jets of reactant hot air.

With the blowing apparatus, reactant hot air can be blown into jets on a scrap metal pile located in the interior of the electric arc furnace. In accordance with the invention, the one or several blowing apparatus have for this purpose overall at least six nozzles with nozzle openings.

During use of the fuel supply devices, when fuel is fed to the jets of reactant hot air, jets of hot gas develop which contact the scrap metal pile. The interior of the electric arc furnace is delimited below by the base, laterally by the side walls and above by the cover wall of the electric arc furnace. Electrodes are present, and apparatuses, in order to supply electrodes into the interior.

All nozzles are advantageously of the same design and are thus configured to output jets of reactant hot air containing the same maximum quantity of reactant hot air.

A blowing apparatus can be embodied for instance as nozzles with lances including nozzle openings. A lance may be inserted for instance through an opening in the cover wall into the interior of the electric arc furnace.

A blowing apparatus may also include nozzles with nozzle openings in a side wall of the electric arc furnace.

A blowing apparatus preferably also includes nozzles with nozzle openings in the cover wall of the electric arc furnace.

The nozzles may be arranged in nozzle heads, each having one or a plurality of nozzles.

It is particularly preferred that the nozzles be arranged in nozzle heads, which can be arranged in openings provided in the cover wall of the electric arc furnace in order to introduce electrodes. The inventive method can in this way be implemented with existing electric arc furnaces without requiring significant modification.

The distance between the nozzles preferably is at least twice the diameter of the nozzle opening of the nozzles. The nozzle openings of all nozzles preferably have the same diameter. This facilitates the even injection of reactant hot gas through all nozzles.

According to a further embodiment, a plurality of at least three separate nozzle heads are present, and each nozzle head has at least two nozzle openings.

It is preferable for the nozzles to be tilted away from one another. This ensures that a number of jets of reactant hot air are produced from the nozzles, so that jets of hot gas produced from such jets do not join to form one jet. The instance of several nozzles within a nozzle head is preferred. The angle cut by the longitudinal axes of neighboring nozzles particularly preferably amounts to 5-10°.

DESCRIPTION OF EMBODIMENTS

Figure 1:
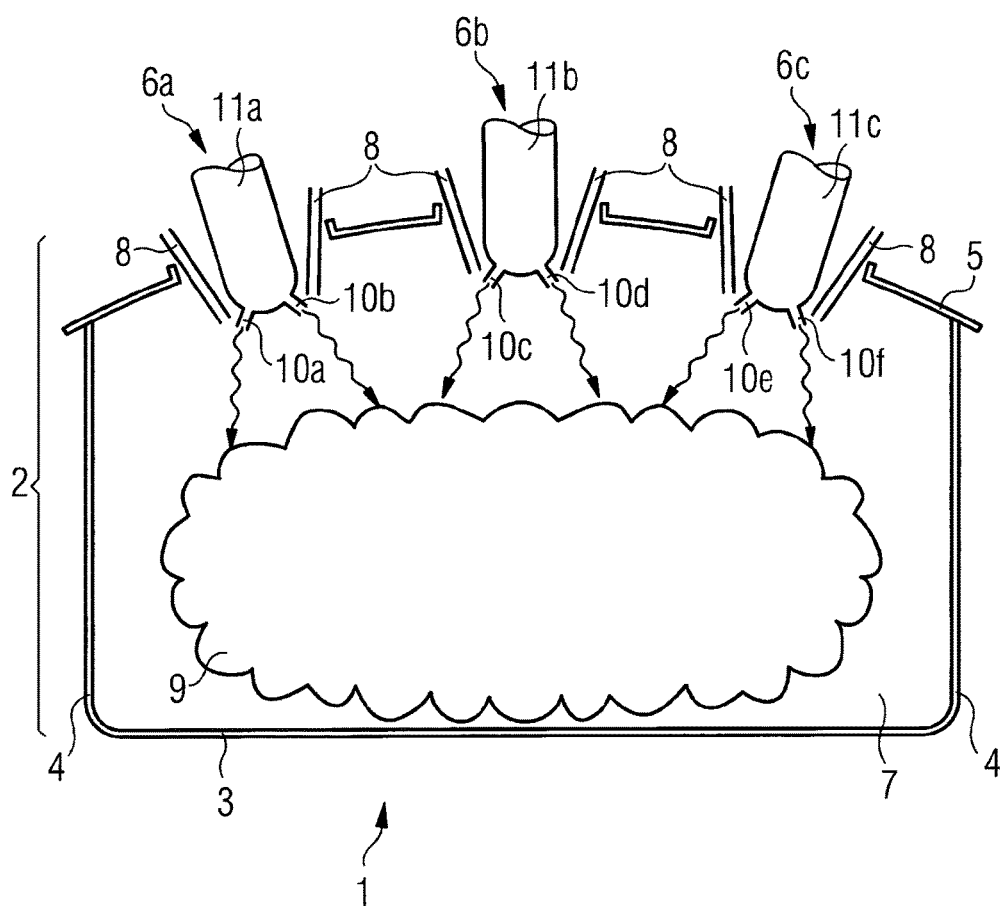
FIG. 1 shows a schematic representation of an example of an inventive apparatus, which is suited to implementing an inventive method, showing an electric arc furnace in a side cross-section of view.

FIG. 1 shows a schematic and exemplary inventive apparatus 1 which is suited to implementing an inventive method, with an electric arc furnace 2 viewed from the side in cross-section. The electric arc furnace 2 has a base 3, side walls 4 and a cover wall 5. The inventive apparatus 1 also includes a number of blowing apparatus 6a, 6b, 6c for supplying reactant hot air into the interior 7 of the electric arc 2. Fuel supply apparatus 8 supply fuel to the jets of reactant hot air emerging from the blowing apparatuses 6a, 6b, 6c, in this case the fuel is natural gas. The exothermic reaction of the fuel, which is drawn into the jets of reactant hot air, produces jets of hot gas, shown schematically by wavy arrows. The jets of hot gas supply energy to the scrap metal pile 9 located in the interior 7 of the electric arc furnace 2. The blowing apparatus 6a, 6b, 6c preferably comprise overall six nozzles 10a, 10b, 10c, 10d, 10e, 10f all with nozzle openings. FIG. 1 shows the apparatus during a first phase of the inventive method, in which energy is supplied to the metal scrap pile 9 by jets of hot gas. The hot gas is supplied in six jets, wherein each of the supplied jets supplies a sixth of the overall quantity of hot gas supplied. The nozzles 10a, 10b, 10c, 10d, 10e, 10f are in this embodiment arranged in three nozzle heads 11a, 11b, 11c, which heads are arranged in openings provided in the cover wall 5 of the electric arc furnace 2 in order to introduce electrodes. Each nozzle head 11a, 11b, 11c in this embodiment has two nozzles and thus has two nozzle openings. The nozzle openings of all nozzles 10a, 10b, 10c, 10d, 10e, 10f have the same diameter. The distance between the nozzles 10a, 10b, 10c, 10d, 10e, 10f is preferably at least twice the diameter of the nozzle openings of the nozzles 10a, 10b, 10c, 10d, 10e, 10f. As a result, the distance between the jets of reactant hot air, when the air is exiting the blowing apparatus 6a, 6b, 6c, is at least twice the diameter of the jets upon exit. In the exemplary configuration shown, the distance between the jets of hot gas in the scrap metal pile is at least five times the diameter of the jets of reactant hot air upon exiting the blowing apparatus 6a, 6b, 6c.

For improved clarity, the representation of electrodes and/or apparatus for routing electrodes into the interior was omitted. Similarly, the representation of the second phase of the inventive method, in which energy is supplied by means of electric arcs, is omitted.

Figure 2:
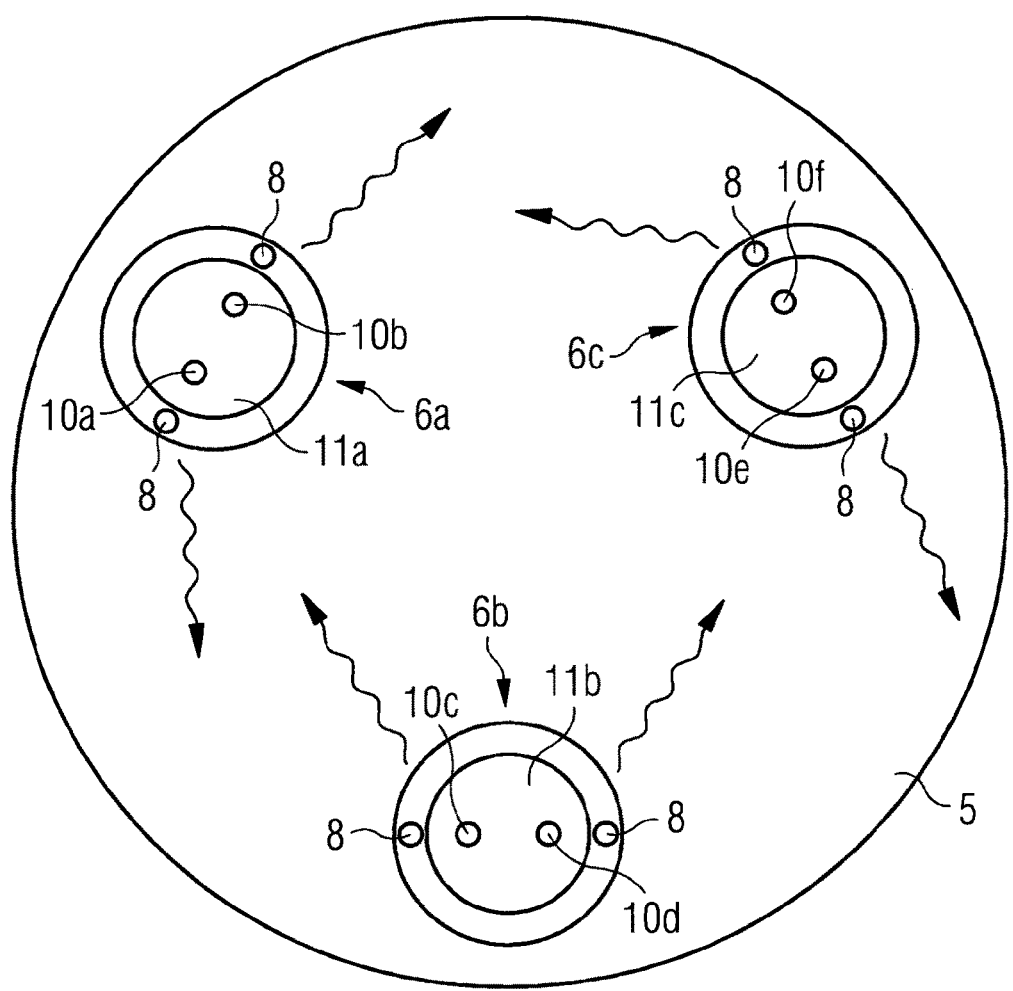
FIG. 2 shows the electric arc furnace of FIG. 1 in a top view.

FIG. 2 shows the electric arc furnace from FIG. 1 in a top view from above onto the cover wall 5. The reference characters are used in the same way as in FIG. 1. The six jets of hot air are also shown as wavy arrows.

The present invention is explained by an example with the aid of the following exemplary embodiment:

In an 80-t electric arc furnace, scrap is charged into two baskets. After the first basket, reactant hot air (18000 Nm3/h), enriched to an oxygen content of 35%, is blasted at a temperature of 1200° C. through six nozzles with 3000 Nm3 per hour and nozzle. Natural gas is supplied to the jets of reactant hot air—the 18000 Nm3/h a quantity of 3200 Nm3/h. Jets of hot gas develop by burning natural gas into the jets of reactant hot air. The nozzles are aligned such that the jets of hot gas are not able to join together in the scrap metal pile and they instead pass through the scrap metal pile in a relatively evenly distributed fashion. In a second phase, the jets of hot gas do not supply gas. Then the electric arcs are produced.

Although the invention was illustrated and described in more detail by the preferred exemplary embodiments, the invention is not restricted by the disclosed examples and other variations can be derived herefrom by the person skilled in the art, without departing from the protective scope of the invention.

LIST OF REFERENCE CHARACTERS

| | |
|---|---|
| 1 | inventive apparatus |
| 2 | electric arc furnace |
| 3 | base |
| 4 | side wall |
| 5 | cover wall |
| 6a, 6b, 6c | blowing apparatus |
| 7 | interior |
| 8 | fuel supply apparatus |
| 9 | metal scrap pile |
| 10a, 10b, 10c, 10d, 10e, 10f | nozzles |
| 11a, 11b, 11c | nozzle head |

LIST OF CITATIONS

Patent Literature

DE19521518
DE10317195

The invention claimed is:

1. A method for supplying energy into a scrap metal pile in an electric arc furnace that includes a cover wall having a center and a plurality of blowing apparatuses, each blowing apparatus being arranged in a respective opening in the cover wall, and each opening in the cover wall being spaced from the other openings in the cover wall and spaced from the center of the cover wall, the method comprising:

in a first phase, supplying energy by a plurality of jets of hot gas into the furnace from the plurality of blowing apparatuses, the energy supplied by the plurality of jets being divided among the plurality of jets, and no jet supplying energy into the furnace supplies more energy than the energy supplied by the plurality of jets divided by the number of the plurality of jets that supply energy into the furnace;

after completing the first phase, a second phase, supplying energy in the furnace by electric arcs in the furnace;

the hot gas being supplied in at least six jets, each of the six jets supplies a maximum of a sixth of the overall quantity of hot gas supplied;

wherein approximately 40 to 60% of the energy supplied to the scrap metal pile is supplied by means of the hot gas, and the remainder of approximately 60 to 40% is supplied by electric arcs in the furnace;

wherein each blowing apparatus includes two spaced nozzles and a fuel apparatus adjacent each nozzle; and wherein each jet of hot gas is produced by reacting fuel from a fuel apparatus and a jet of reactant hot gas from a nozzle adjacent the fuel apparatus.

2. The method as claimed in claim 1, further comprising supplying the jets of reactant hot air from at least one blowing apparatus, wherein the jets are oriented so that the distance between the jets of the reactant hot air upon exiting the blowing apparatus is at least twice a diameter of the jets of the reactant hot air upon the reactant hot air exiting.

3. The method as claimed in claim 1, further comprising supplying the jets with the hot air from at least one blowing apparatus wherein a distance between the jets of hot gas in the scrap metal pile is at least five times a diameter of the jets of the reactant hot air upon the hot air exiting the blowing apparatus.

4. The method as claimed in claim 1, further comprising:
in a first phase, supplying energy using jets of hot gas;
in a subsequent second phase, discontinuing the jets of hot gas and then supplying energy using the electric arcs; and further comprising:
generating the electric arcs with a respective operating area of each arc; and
aligning at least one of the jets of hot gas toward zones of the scrap metal pile that are outside the operating area of each electric arc.

5. The method as claimed in claim 4, wherein the jets of hot gas that are aligned toward the zones of the scrap metal pile and are outside of the operating area of the electric arc each conveys a maximum of a twelfth of the overall quantity of hot gas supplied.

6. An apparatus, the apparatus comprising:
an electric arc furnace having a base and side walls defining an interior of the electric arc furnace, and a cover wall located above the interior of the electric arc furnace, the cover wall having a center and a plurality of openings spaced from the center and spaced from one another;
a plurality of blowing apparatuses, each configured for supplying a let of reactant hot air into the interior of the electric arc furnace and each blowing apparatus being in a respective opening in the cover wall, the blowing apparatuses overall having at least six nozzles each with a respective nozzle opening, each blowing apparatus having at least one of the at least six nozzles; and
a plurality of fuel supply apparatuses each positioned adjacent a respective nozzle to supply fuel to the let of the reactant hot air from the nozzle; and
wherein the distance between the nozzles is at least twice a diameter of the nozzle openings of the nozzles.

7. The apparatus as claimed in claim 6, further comprising all nozzles are the same.

8. The apparatus as claimed in claim 6, further comprising the blowing apparatus also includes the nozzles having the nozzle openings in the cover wall of the electric arc furnace.

9. The apparatus as claimed in claim 6, wherein the plurality of nozzle heads arranged in openings in the cover wall of the electric arc furnace that are provided for the introduction of electrodes.

10. The apparatus as claimed in claim 6, further comprising the nozzle openings of all of the nozzles have the same diameter.

11. The apparatus as claimed in claim 6, further comprising at least three separate ones of the nozzle heads and at least two of the nozzle openings are present in each of the nozzle heads.

12. A method for supplying energy into a scrap metal pile in an electric arc furnace, that includes a cover wall having a center and a plurality of blowing apparatuses, each blowing apparatus being arranged in a respective opening in the cover wall, and each opening in the cover wall being spaced from the other openings in the cover wall and spaced from the center of the cover wall, the method comprising:
producing a plurality of jets of hot gas, each jet of hot gas being produced by reacting fuel from a fuel apparatus with a jet of reactant hot air from a nozzle located adjacent the fuel apparatus;
in a first phase, supplying energy by the plurality of jets of hot gas into the furnace, after completing the first phase, in a second phase, supplying energy in the furnace by electric arcs in the furnace;
wherein each of the plurality of jets supplies a respective fraction of the overall quantity of hot gas supplied, the energy supplied by the jets being divided among the jets, and no jet supplying energy into the furnace supplies more energy than the energy supplied by the jets divided by the number of jets that supply energy into the furnace; and
wherein approximately 40 to 60% of the energy supplied to the scrap metal pile is supplied by means of the hot gas, and the remainder of approximately 60 to 40% is supplied by electric arcs in the furnace.

13. The method as claimed in claim 12, further comprising supplying the jets of reactant hot air from at least one blowing apparatus, wherein the jets are oriented so that the distance between the jets of the reactant hot air upon exiting the blowing apparatus is at least twice a diameter of the jets of the reactant hot air upon the reactant hot air exiting.

14. The method as claimed in claim 12, further comprising supplying the jets with the hot air from at least one blowing apparatus, wherein a distance between the jets of hot gas in the scrap metal pile is at least five times a diameter of the jets of the reactant hot air upon the hot air exiting the blowing apparatus.

15. The method as claimed in claim 12, further comprising:
in a first phase, supplying energy using jets of hot gas;
in a subsequent second phase, discontinuing the jets of hot gas and then supplying energy using the electric arcs; and further comprising:
generating the electric arcs with a respective operating area of each arc; and
aligning at least one of the jets of hot gas toward zones of the scrap metal pile that are outside the operating area of each electric arc.

16. The method as claimed in claim 15, wherein the jets of hot gas that are aligned toward the zones of the scrap metal pile and are outside of the operating area of the electric arc.

17. An apparatus, the apparatus comprising:

an electric arc furnace having a base and side walls defining an interior of the electric arc furnace, and a cover wall located above the interior of the electric arc furnace, the cover wall having a center and a plurality of spaced openings spaced from one another and the center;

a plurality of blowing apparatuses each configured for supplying a jet of reactant hot air into the interior of the electric arc furnace and each received in a respective opening in the cover wall, each blowing apparatus comprising a nozzle head, and at least one nozzle; and a plurality of fuel supply apparatuses each positioned to supply fuel to a respective jet of the reactant hot air supplied from a respective nozzle.

18. The apparatus as claimed in claim 17, further comprising the distance between the nozzles is at least twice a diameter of the nozzle openings of the nozzles.

19. The apparatus as claimed in claim 17, further comprising the blowing apparatus also includes the nozzles having the nozzle openings in the cover wall of the electric arc furnace.

20. The apparatus as claimed in claim 17, wherein the plurality of nozzle heads arranged in openings in the cover wall of the electric arc furnace that are provided for the introduction of electrodes.

21. The apparatus as claimed in claim 17, further comprising the nozzle openings of all of the nozzles have the same diameter.

\* \* \* \* \*